P. WISOTZKY.
VENT FOR NURSING NIPPLES.
APPLICATION FILED JULY 24, 1912.
1,066,873.
Patented July 8, 1913.
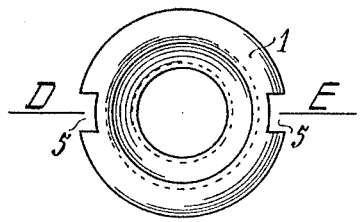
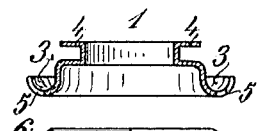
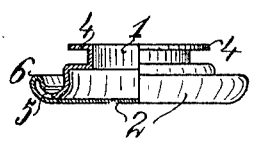
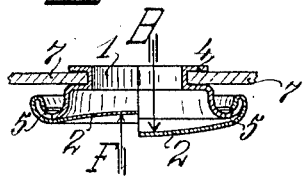
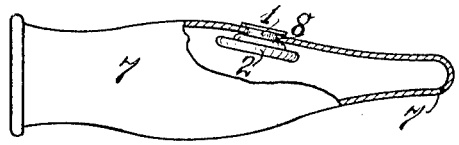
WITNESSES
INVENTOR
Philipp Wisotzky.

UNITED STATES PATENT OFFICE.

PHILIPP WISOTZKY, OF FRANKFORT-ON-THE-MAIN, GERMANY.

VENT FOR NURSING-NIPPLES.

1,066,873. Specification of Letters Patent. Patented July 8, 1913.

Application filed July 24, 1912. Serial No. 711,291.

*To all whom it may concern:*

Be it known that I, PHILIPP WISOTZKY, a subject of the Emperor of Germany, and a resident of Frankfort-on-the-Main, in the Empire of Germany, have invented certain new and useful Improvements in Vents for Nursing-Nipples, of which the following is a specification.

My invention relates to mouthpieces of sucking bottles and has for its object to provide such mouthpieces with an automatic valve for the entrance of air if a vacuum occurs in the bottle.

With such object in view my invention consists in an air inlet valve having but two parts removably connected to each other and exchangeably secured in a hole of the wall of the mouthpiece, so that the valve as easily may be removed as dismounted for cleaning the mouthpiece and the parts of the valve.

In the accompanying drawing;—Figure 1 is a plan view of the cup shaped ring of the valve, Fig. 2 is a cross section according to the line D—E of the Fig. 1, Fig. 3 shows the diaphragm of the valve, partly in front elevation and partly in cross section. Fig. 4 shows the valve, partly in front elevation and partly in cross section. Fig. 5 is a cross section of the valve, showing the diaphragm in two different positions. Fig. 6 is an elevation in a smaller scale of the mouthpiece with parts broken away, showing the valve in place.

My new valve for mouthpieces of sucking bottles consists of a cup shaped ring 1, preferably made of aluminium, and a diaphragm 2 of rubber or the like material. The ring 1 is provided with an outer rim 3 bent back, and with an inner flanged rim 4. The said flanged rim serves for connecting the valve with the mouthpiece, as is represented in Figs. 5 and 6. The outer rim 3 is provided with two cut off portions or openings 5 arranged diametrically opposite one another and serving for the entrance of the air as hereinafter will be described. The rim 6 of the diaphragm 2 is bent up to fit the rim 3, when the diaphragm is stretched over the ring 1, as shown in Figs. 4 and 5. For connecting the valve with the mouthpiece 7 a hole 8 is arranged on a suitable place in the wall of the same.

In using my invention I insert the valve with its flanged rim 4 into the hole 8 of the mouthpiece 7, after having stretched the diaphragm 2 over the ring 1. In the normal position the cut off portions or openings 5 are held closed by the diaphragm 2 preventing in such a way the passage through the said openings 5. In case a vacuum occurs in the bottle being connected with the mouthpiece 7, the atmospheric pressure will act upon the diaphragm in the direction of the arrow B (Fig. 5) and in expanding the diaphragm the openings 5 will be freed to give passage to the air which now will enter into the bottle until the vacuum is compensated. If, on the other hand, a pressure, for instance the weight of the milk filled into the bottle, should act upon the other side of the diaphragm 2, that means in the direction of the arrow F (Fig. 5) the diaphragm in expanding will firmly close the openings 5 preventing the milk from flowing out through the same.

What I claim is:—

1. Vents for nursing nipples comprising a slotted ring and an elastic diaphragm secured to said ring, substantially as described.

2. Vents for nursing nipples comprising a ring, cut off portions arranged in said ring, and a diaphragm stretched over the ring and normally closing the said cut off portions, substantially as described.

3. Vents for nursing nipples comprising a flanged ring, cut off portions arranged in the outer rim of the ring, and a diaphragm removably secured to said outer rim of the ring, substantially as described.

In testimony whereof I affix my signature in presence of two witnesses.

PHILIPP WISOTZKY.

Witnesses:
 JEAN GRUND,
 CARL GRUND.